US012672090B2

(12) United States Patent (10) Patent No.: US 12,672,090 B2
Barbu et al. (45) Date of Patent: Jun. 30, 2026

(54) PRE-EMPTIVE RECONFIGURATION OF MEASUREMENT GAP PATTERN FOR LOW POSITIONING LATENCY

(71) Applicant: Nokia Technologies Oy, Espoo (FI)

(72) Inventors: Oana-Elena Barbu, Aalborg (DK); Ping-Heng Kuo, London (GB); Diomidis Michalopoulos, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 395 days.

(21) Appl. No.: 18/250,439

(22) PCT Filed: Oct. 7, 2021

(86) PCT No.: PCT/FI2021/050661
§ 371 (c)(1),
(2) Date: Apr. 25, 2023

(87) PCT Pub. No.: WO2022/090608
PCT Pub. Date: May 5, 2022

(65) Prior Publication Data
US 2024/0007986 A1 Jan. 4, 2024

Related U.S. Application Data

(60) Provisional application No. 63/108,657, filed on Nov. 2, 2020.

(51) Int. Cl.
*H04W 64/00* (2009.01)
(52) U.S. Cl.
CPC .................................. *H04W 64/00* (2013.01)
(58) Field of Classification Search
CPC .................................................... H04W 64/00
(Continued)

(56) References Cited

U.S. PATENT DOCUMENTS

2013/0017841 A1 1/2013 Kazmi et al.
2014/0094188 A1 4/2014 Kazmi et al.
(Continued)

FOREIGN PATENT DOCUMENTS

EP 3709699 A1 * 9/2020 ............. H04L 5/001
WO 2011/142710 A1 11/2011
(Continued)

OTHER PUBLICATIONS

Vivo, 3GPP, "Discussion on potential positioning enhancements"; R1-2007666; Ran WG1 (Nov. 1, 2020); https://ftp.3gpp.org/tsg_ran/WG1 _RL 1/TSGR1_103-e/Docs/R1-2007666.zip (Year: 2020).*
(Continued)

*Primary Examiner* — Rafael Pérez-Gutiérrez
*Assistant Examiner* — Aaron C. Deditch
(74) *Attorney, Agent, or Firm* — Carter, DeLuca & Farrell LLP

(57) ABSTRACT

A measurement gap pattern configuration method of a network element (130) of a wireless communications system includes sending, by the network element (130), assistance data to a user equipment (UE) (110) of the wireless communications system; sending, by the network element (130), positioning performance target data and at least a portion of the assistance data to a serving next generation Node B (gNB) (120) of the UE (110); sending a positioning request to the UE (110); and notifying the gNB (120) that a positioning session has started with respect to the UE (110) by sending a positioning session start notification message to the gNB (120).

1 Claim, 6 Drawing Sheets

(58) Field of Classification Search

USPC ........................................................ 455/456.1

See application file for complete search history.

(56) References Cited

U.S. PATENT DOCUMENTS

| | | | | |
|---|---|---|---|---|
| 2018/0132204 A1 | 5/2018 | Siomina et al. | | |
| 2020/0037283 A1 | 1/2020 | Edge et al. | | |
| 2020/0053690 A1 | 2/2020 | Fischer et al. | | |
| 2020/0178102 A1* | 6/2020 | Chen | .................... | H04W 24/10 |
| 2021/0160711 A1* | 5/2021 | Chen | .................... | H04W 24/10 |

FOREIGN PATENT DOCUMENTS

| | | | | | |
|---|---|---|---|---|---|
| WO | 2018/082032 A1 | 5/2018 | | | |
| WO | WO-2020034193 A1 * | 2/2020 | | .......... | H04L 5/0091 |
| WO | WO-2022090608 A1 * | 5/2022 | | .......... | G01S 5/0236 |

OTHER PUBLICATIONS

3GPP TS 29.572 version 16.3.0 Release 16—ETSI TS 129 572 V16.3.0-2020-07 (Year: 2020).*

"New SID on NR Positioning Enhancements", 3GPP TSG RAN Meeting #86, RP-193237, Agenda Item: 9.1.1, Qualcomm Incorporated, Dec. 9-12, 2019, 4 pages.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

Destino et al., "A New Position Quality Metric for NR RAT Dependent OTDOA Positioning Methods", 16th Workshop on Positioning, Navigation and Communications (WPNC), Oct. 23-24, 2019, 5 pages.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"3rd Generation Partnership Project; Technical Specification Group Radio Access Network; LTE Positioning Protocol (LPP) (Release 16)", 3GPP TS 37.355, V16.1.0, Jul. 2020, pp. 1-292.

International Search Report and Written Opinion received for corresponding Patent Cooperation Treaty Application No. PCT/FI2021/050661, dated Dec. 22, 2021, 17 pages.

"3rd Generation Partnership Project; Technical Specification Group Radio Access Network; NG Radio Access Network (NG-RAN); Stage 2 functional specification of User Equipment (UE) positioning in NG RAN (Release 16)", 3GPP TS 38.305, V16.2.0, Sep. 2020, pp. 1-117.

Extended European Search Report received for corresponding European Patent Application No. 21885422.2, dated Aug. 7, 2024, 14 pages.

"Discussion on potential positioning enhancements", 3GPP TSG RAN WG1 #103-e, R1-2007666, Agenda Item: 8.5.3, vivo, Oct. 26-Nov. 13, 2020, 49 pages.

"Discussion on end-to-end latency reduction for DL/UL positioning", 3GPP RAN WG2 Meeting #112-e, R2-2008886, Agenda Item: 8.11.2, InterDigital Inc, Nov. 2-13, 2020, 6 pages.

* cited by examiner

100

UE
110 gNB
120

LMF
130

PRE-EMPTIVE RECONFIGURATION OF MEASUREMENT GAP PATTERN FOR LOW POSITIONING LATENCY

RELATED APPLICATION

This application was originally filed as PCT Application No. PCT/FI2021/050661 on Oct. 7, 2021, which claims priority from U.S. Provisional Application No. 63/108,657, filed on Nov. 2, 2020, each of which is incorporated herein by reference in its entirety.

TECHNICAL FIELD

One or more example embodiments relate generally to wireless communications and, more specifically, to facilitating positioning in Third Generation Partnership Project (3GPP) Fifth Generation (5G) New Radio (NR) networks.

BACKGROUND

Positioning is one of the key enablers for various verticals and use cases that Third Generation Partnership Project (3GPP) Fifth Generation (5G) New Radio (NR) radio aims to support. By obtaining the knowledge relating to approximate/precise positions of the devices, applications such as location-based services, autonomous driving, and industrial Internet of things (IoT) can be enabled with a 5G system. Although accurate positioning typically could be fulfilled by global navigation satellite system (GNSS) techniques such as global positioning system (GPS) techniques, the accuracy provided by such techniques may be insufficient with respect to some indoor scenarios such as factory automation or warehouse management. Thus, RAT-dependent positioning methods based on downlink/uplink signals developed by 3GPP standards (e.g. positioning reference signal (PRS)/ sounding reference signal (SRS)) have been extensively studied in LTE/NR.

SUMMARY

According to at least some example embodiments, a measurement gap pattern configuration method of a network element of a wireless communications system includes sending, by the network element, assistance data to a user equipment (UE) of the wireless communications system; sending, by the network element, positioning performance target data and at least a portion of the assistance data to a serving next generation Node B (gNB) of the UE; sending a positioning request to the UE; and notifying the gNB that a positioning session has started with respect to the UE by sending a positioning session start notification message to the gNB.

The network element may be a location management function (LMF) node of a core network or a radio access network of the wireless communications system.

The portion of the assistance data may include a neighbor cell information list, which includes one of more cell IDs of one or more neighbor transmission and reception points (TRPs) of the UE.

According to at least some example embodiments, a measurement gap pattern configuration method of a next generation Node B (gNB) of a wireless communications system includes receiving, by the gNB, positioning performance target data and assistance data, the gNB being a serving gNB of a user equipment (UE); determining, by the gNB, a measurement gap (MG) pattern based on the positioning performance target data and the assistance data, the determined MG pattern including at least one of an MG duration and an MG periodicity; and sending the determined MG pattern to the UE.

The measurement gap pattern configuration method may further includes sending one or more triggering conditions to the UE, wherein the one or more triggering conditions specify one or more conditions under which the UE i should apply the determined MG pattern.

The assistance data may include a neighbor cell information list, which includes one of more cell IDs of one or more neighbor transmission and reception points (TRPs) of the UE.

The method may further include receiving, at the gNB, a positioning session start notification from a location management function (LMF) node of the wireless communications system; and receiving, at the gNB, a positioning session end notification from the LMF node of the wireless communications system, the positioning session start notification indicating a start of a positioning session of the UE, the positioning session end notification indicating an end of the positioning session of the UE.

According to at least some example embodiments, a measurement gap pattern configuration method of a user equipment (UE) of a wireless communications system includes receiving, at the UE, a measurement gap (MG) pattern from a serving next generation node B (gNB) of the UE; receiving, at the UE, one or more triggering conditions from the serving gNB, the one or more triggering conditions specifying one or more conditions under which the UE should apply the received MG pattern; and in response to determining that at least one of the one or more triggering conditions have been met, using the received MG pattern to perform inter frequency (IF) measurements with respect to one or more neighbor transmission and reception points (TRPs) of the UE.

One of the conditions from among the one or more triggering conditions may be receiving a positioning request message from a location management function (LMF) node of the wireless communications system.

The received MG pattern may specify at least one of an MG periodicity and a MG duration.

According to at least some example embodiments, a network element of a wireless communications system includes memory storing computer-executable instructions; and a processor configured to execute the computer-executable instructions, wherein the computer-executable instructions include sending, by the network element, assistance data to a user equipment (UE) of the wireless communications system; sending, by the network element, positioning performance target data and at least a portion of the assistance data to a serving next generation Node B (gNB) of the UE; sending a positioning request to the UE; and notifying the gNB that a positioning session has started with respect to the UE by sending a positioning session start notification message to the gNB.

The network element may be a location management function (LMF) node of a core network or a radio access network of the wireless communications system.

The portion of the assistance data may include neighbor cell information list, which includes one of more cell IDs of one or more neighbor transmission and reception points (TRPs) of the UE.

According to at least some example embodiments, a next generation Node B (gNB) of a wireless communications system includes memory storing computer-executable instructions; and a processor configured to execute the computer-executable instructions, wherein the computer-executable instructions include receiving positioning performance target data and assistance data, the gNB being a serving gNB of a user equipment (UE); determining a measurement gap (MG) pattern based on the positioning performance target data and the assistance data, the determined MG pattern including at least one of an MG duration and an MG periodicity; and sending the determined MG pattern to the UE.

The computer-executable instructions may further include sending one or more triggering conditions to the UE, wherein the one or more triggering conditions specify one or more conditions under which the UE should apply the determined MG pattern.

The assistance data may include neighbor cell information list, which includes one of more cell IDs of one or more neighbor transmission and reception points (TRPs) of the UE.

The computer-executable instructions may further include receiving a positioning session start notification from a location management function (LMF) node of the wireless communications system; and receiving a positioning session end notification from the LMF node of the wireless communications system, the positioning session start notification indicating a start of a positioning session of the UE, the positioning session end notification indicating an end of the positioning session of the UE.

According to at least some example embodiments, a user equipment (UE) of a wireless communications system includes memory storing computer-executable instructions; and a processor configured to execute the computer-executable instructions, wherein the computer-executable instructions include receiving a measurement gap (MG) pattern from a serving next generation node B (gNB) of the UE; receiving one or more triggering conditions from the serving gNB, the one or more triggering conditions specifying one or more conditions under which the UE should apply the received MG pattern; and in response to determining that at least one of the one or more triggering conditions have been met, using the received MG pattern to perform inter frequency (IF) measurements with respect to one or more neighbor transmission and reception points (TRPs) of the UE.

One of the conditions from among the one or more triggering conditions may be receiving a positioning request message from a location management function (LMF) node of the wireless communications system.

The MG pattern may specify at least one of an MG periodicity and a MG duration.

According to at least some example embodiments, a network element of a wireless communications system includes sending means for sending assistance data to a user equipment (UE) of the wireless communications system, sending positioning performance target data and at least a portion of the assistance data to a serving next generation Node B (gNB) of the UE, and sending a positioning request to the UE; and notifying means for notifying the gNB that a positioning session has started with respect to the UE by sending a positioning session start notification message to the gNB.

According to at least some example embodiments, a next generation Node B (gNB) of a wireless communications system includes receiving means for receiving positioning performance target data and assistance data, the gNB being a serving gNB of a user equipment (UE); determining means for determining a measurement gap (MG) pattern based on the positioning performance target data and the assistance data, the determined MG pattern including at least one of an MG duration and an MG periodicity; and sending means for sending the determined MG pattern to the UE.

According to at least some example embodiments, a user equipment (UE) of a wireless communications system includes receiving means for receiving a measurement gap (MG) pattern from a serving next generation node B (gNB) of the UE, and receiving one or more triggering conditions from the serving gNB, the one or more triggering conditions specifying one or more conditions under which the UE should apply the received MG pattern; determining means for determining whether the one or more triggering conditions have been met; and measurement means for using the received MG pattern to perform inter frequency (IF) measurements with respect to one or more neighbor transmission and reception points (TRPs) of the UE, in response to the determining means determining that at least one of the one or more triggering conditions have been met.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
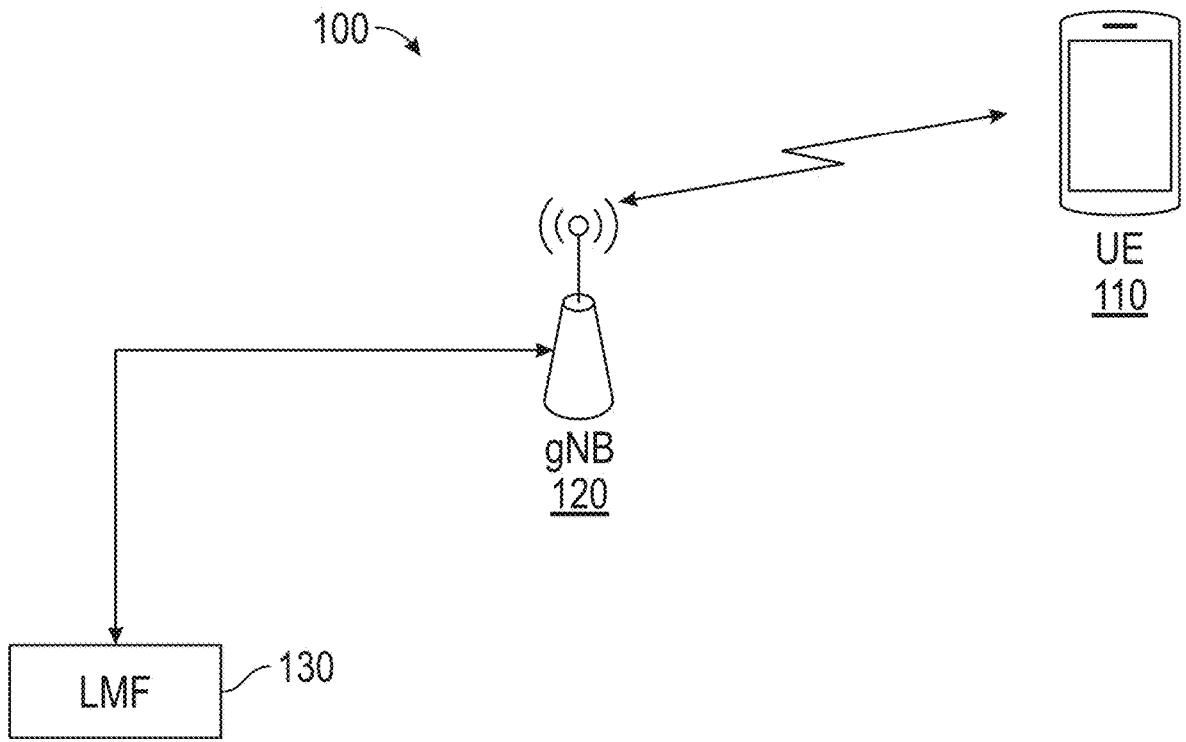
FIG. 1 is a diagram illustrating a portion of a wireless communications system according to at least some example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

1. Overview of Measurement Gap Pattern Configuration Method According to at Least Some Example Embodiments, and Example Advantages Thereof.

Positioning in Third Generation Partnership Project (3GPP) Fifth Generation (5G) New Radio (NR) can include the use of inter-frequency (IF) measurement gaps (MGs) in order to allow a UE to perform IF measurements including, for example, reference signal time difference (RSTD) measurements. These MGs are configured by the network during the radio resource control (RRC) connected state, and the MGs have a periodicity of 20, 40, 60, 80, 120 milliseconds (ms) with a duration no longer than 6 milliseconds (ms), corresponding to about four positioning reference signals (PRS) subframes.

In 3GPP 5G NR positioning, the MGs are used by the UE to switch from a serving cell carrier to a carrier of a different frequency, perform RSTD measurement on the new carrier, and switch back to the serving cell carrier. MGs are configured by the serving gNB since in observed time difference of arrival (OTDOA) positioning, the 5G core (5GC) location management function (LMF) does not inform the serving next generation NodeB (gNB) about the impeding positioning request. Therefore, in order to configure an MG pattern, the serving gNB needs to be informed by the UE itself that a configuration/reconfiguration of the MG is needed. This procedure is described, for example, in 3GPP Technical Specification (TS) 38.331 V16.1.0 (2020-07) and will be discussed in greater detail below with reference to FIG. 3.

As is also discussed in greater detail below with reference to FIG. 3, the aforementioned 3GPP 5G NR positioning includes a number of inefficiencies, examples of which include:

(i) lengthy RRC connection reconfiguration processes due, in part, to ping-ponging messages being exchanged between a UE and a corresponding serving gNB; and (ii) inefficient use of network resources due to, for example, MGs being configured to have a duration and/or periodicity that is too high thus reducing the performance of a UE (e.g., by increasing the amount of time during which a UE performs neither transmission or reception data with respect to the serving cell).

The aforementioned example inefficiencies, which may result in lower performance of a UE in general, may be particularly disadvantageous when a UE is transmitting and/or receiving ultra-reliable low-latency communication (URLLC) data.

As will be discussed in greater detail below with reference to FIGS. 3-6, MG pattern reconfiguration methods according to at least some example embodiments may address the above-referenced issues. For example, MG pattern reconfiguration methods according to at least some example embodiments include coupling MG configuration with positioning performance target information of a UE such that the serving gNB of the UE is notified of the positioning performance target information of the UE before a positioning request is received from the LMF. Accordingly, the serving gNB may use the positioning performance target information of the UE to determine, preemptively (e.g., before the LMF sends the UE a positioning request), an MG configuration that satisfies the positioning performance target information of the UE. Examples of positioning performance target information include, but are not limited to:

(i) position accuracy (e.g., desired or, alternatively, required location precision values such as less than 1 meter (m), or less than 0.2 meters (m)), depending on the application consuming the location information; and (ii) target latency measured as the elapsed time from the location request to the obtaining of the location coordinates (e.g., desired or, alternatively, required latency values such as less than 100 milliseconds (ms), or less than 10 milliseconds (ms)).

Further, positioning performance target information may differ, respectively, for different applications (e.g., location-based services, autonomous driving, and industrial Internet of things (IoT), etc.) as is discussed, for example, in 3GPP document RP-193237.

Further, as is also discussed in greater detail below with reference to FIGS. 3-6, according to at least some example embodiments, the serving gNB may reconfigure the UE with the determined MG in a number of ways, examples of which include:

(i) reconfiguring the UE with the determined MG only after a positioning request is sent by the LMF; and (ii) reconfiguring the UE with the determined MG after the gNB preemptively determines the MG, and only triggering the use of the determined MG at the UE after a positioning request is received at the UE from the LMF.

Thus, MG pattern reconfiguration methods according to at least some example embodiments may provide one or more of at least the following advantages:

1. more efficient network resource use by avoiding the over-provision of MGs (e.g., in terms of duration and/or periodicity) while still achieving a desired level of positioning performance (e.g., by satisfying the positioning performance target information); and 2. the overhead and amount of time associated with the process of reconfiguring the UE with the MG may be reduced.

For example, in conventional positioning techniques, the gNB re-configures MG, as per UE request, as frequently as the UE requests. However, according to at least some example embodiments, the radio access network (RAN) (e.g., the serving gNB) is allowed to flexibly activate the desired MG patterns for positioning, only when there is a positioning request from the LMF because, in comparison to conventional positioning techniques, the serving gNB does not determine when to reconfigure the UE with an MG on the basis of a request from the UE. Instead, the LMF triggers the serving gNB to determine a new MG and to re-configure the UE with the new MG.

As another example, in conventional positioning techniques, the serving gNB does not know in advance when to re-configure the UE with an MG. Therefore, the serving gNB generally waits for a request from the UE. This is a lengthy iterative process that may result in a large amount of overhead. However, according to at least some example embodiments, instead of ping-ponging MG re-configurations and acknowledgements with the UE, the serving gNB determines a new MG pattern in coordination with the LMF, and the serving gNB signals the new MG pattern to the UE (i.e., the serving gNB reconfigures the UE with the new MG pattern), prior to the LMF sending a positioning request to the UE.

Examples of an architecture of a wireless communications network and a structure of a network element according to at least some example embodiments, will now be discussed below with reference to FIGS. 1 and 2.

2. Example Architecture of a Wireless Communications System and an Example Structure of a Network Element Thereof.

FIG. 1 illustrates a wireless communications system 100 according to at least one example embodiment. As shown in FIG. 1, a wireless communications system 100 includes a user equipment (UE) 110, a next generation NodeB (gNB) 120, and a core network (CN) node 130. The UE 110 and the gNB 120 may communicate with each other wirelessly. For example, the UE 110 may be attached to a cell of the gNB 120, the UE 110 may wirelessly transmit uplink (UL) data to the gNB 120 and the gNB 120 may wirelessly transmit downlink (DL) data to the UE 110. Further, the gNB 120 and the CN node 130 may be connected to each other and may transmit data to one another.

Examples of the UE 110 include, but are not limited to, a mobile device, a tablet, a laptop computer, a wearable device, an Internet of Things (IoT) device, a desktop computer and/or any other type of stationary or portable device capable of operating according to the 5G NR communication standard, and/or other wireless communication standard. In the example illustrated in FIG. 1, the UE 110 is a mobile device.

The CN node 130 is a physical node of a CN of the wireless communications system 100 and may embody one or more CN elements. According to at least some example embodiments, the CN of the wireless communications system 100 is, or includes, a 5G core (5GC). As is shown in FIG. 1, one example of a CN element that may be embodied by the CN node 130 is a location management function (LMF). Accordingly, in the present specification, the CN node 130 may also be referred to as the LMF node 130 or the LMF 130. Further, instead of, or in addition to, implementing the LMF in the CN of the wireless communications system 100 (e.g., in CN node 130), the LMF may be implemented by one or more nodes or devices included in a radio access network (RAN) of the wireless communications system 100.

According to at least some example embodiments, the wireless communications system 100 is not limited to the elements illustrated in FIG. 1 and the wireless communications system 100 may include numbers of constituent elements different than those shown in FIG. 1. For example, the wireless communications system 100 may include any number of UE devices, any number of gNBs, any number of CN nodes, etc.

Additionally, though not illustrated, the wireless communications system 100 may further include additional 5GC network elements (e.g., in addition to LMF node 130). For example, the gNB 120 may be connected to an access and mobility management function (AMF) element and/or a session management function (SMF) element. Additionally, though not illustrated, the wireless communications system 100 may further include long-term evolution (LTE) network elements that are connected to the gNB 120. Examples of such LTE elements include, but are not limited to, LTE radio access technology (RAT) network elements (e.g., evolved universal mobile telecommunications system (UMTS) terrestrial radio access network (E-UTRAN) network elements) such as evolved node Bs (eNBs), and LTE core network elements (e.g., evolved packet core (EPC) network elements) such as mobility management entities (MMEs). An example structure which may be used to embody one or more radio network elements (e.g., gNBs, UEs, NTN devices, NTN gateways, gNB-CUs, etc.) of the wireless communications system 100 will now be discussed below with respect to FIG. 2.

Figure 2:
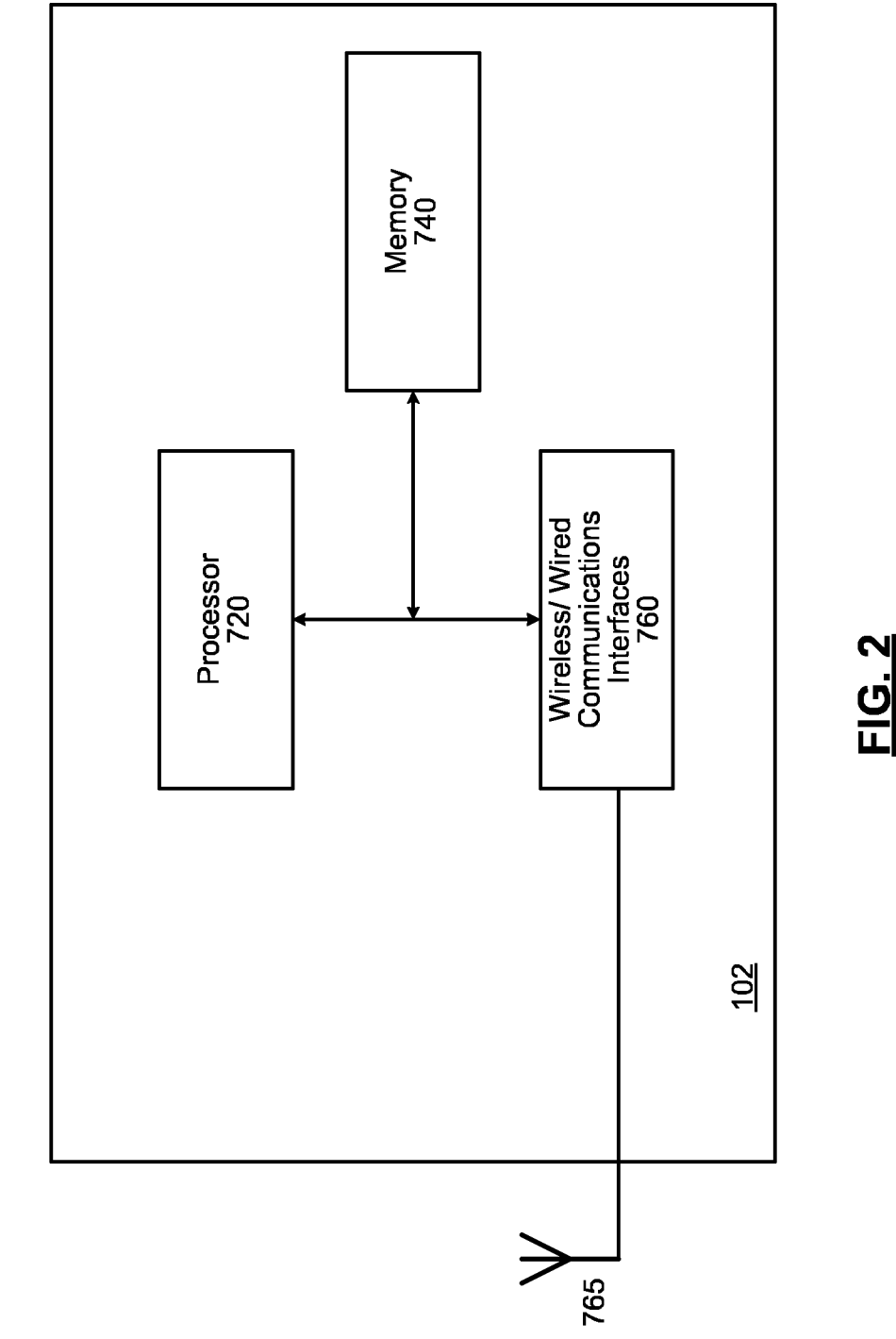
FIG. 2 illustrates a network element according to at least some example embodiments.

FIG. 2 illustrates an example embodiment of a network element. Referring to FIG. 2, a network element 102 includes: a memory 740, a processor 720, and various communications interfaces 760 connected to each other; and one or more antennas or antenna panels 765 connected to the various communications interfaces 760. The various interfaces 760 and the antenna 765 may constitute a transceiver for transmitting/receiving data to/from a UE, a gNB, a CN node, a CN element, and/or another radio network element via one or more of a plurality of wireless beams. According to at least some example embodiments, in addition to, or alternatively, instead of, including interfaces for supporting wireless communications, various interfaces 760 may include interfaces for supporting wired communications.

As will be appreciated, depending on the implementation of the network element 102, the network element 102 may include many more components than those shown in FIG. 2 for providing the functionalities of the particular element of the wireless communications system 100 being embodied by the network element 102 (e.g., functionalities of a UE, a CN element and/or node, a gNB, etc. in accordance with one or more example embodiments). However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the particular element of the wireless communications system 100 being embodied by the network element 102 (e.g., functionalities of a UE, a CN element and/or node, a gNB, etc. in accordance with one or more example embodiments) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium. According to at least some example embodiments, the memory 740 may store computer-executable instructions corresponding to any or all steps discussed with reference to FIGS. 3-6.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the one or more antennas 765, or other input/output components. As will be understood, the various interfaces 760 and programs stored in the memory 740 to set forth the special purpose functionalities of the network element 102 will vary depending on the particular element of the wireless communications system 100 being embodied by the network element 102.

The various interfaces 760 may also include one or more user input devices (e.g., a keyboard, a keypad, a mouse, or the like) and user output devices (e.g., a display, a speaker, or the like). Example methods for configuring MG patterns will now be discussed below with reference to FIGS. 3-6.

3. Example MG Pattern Configuration Methods

Figure 3:
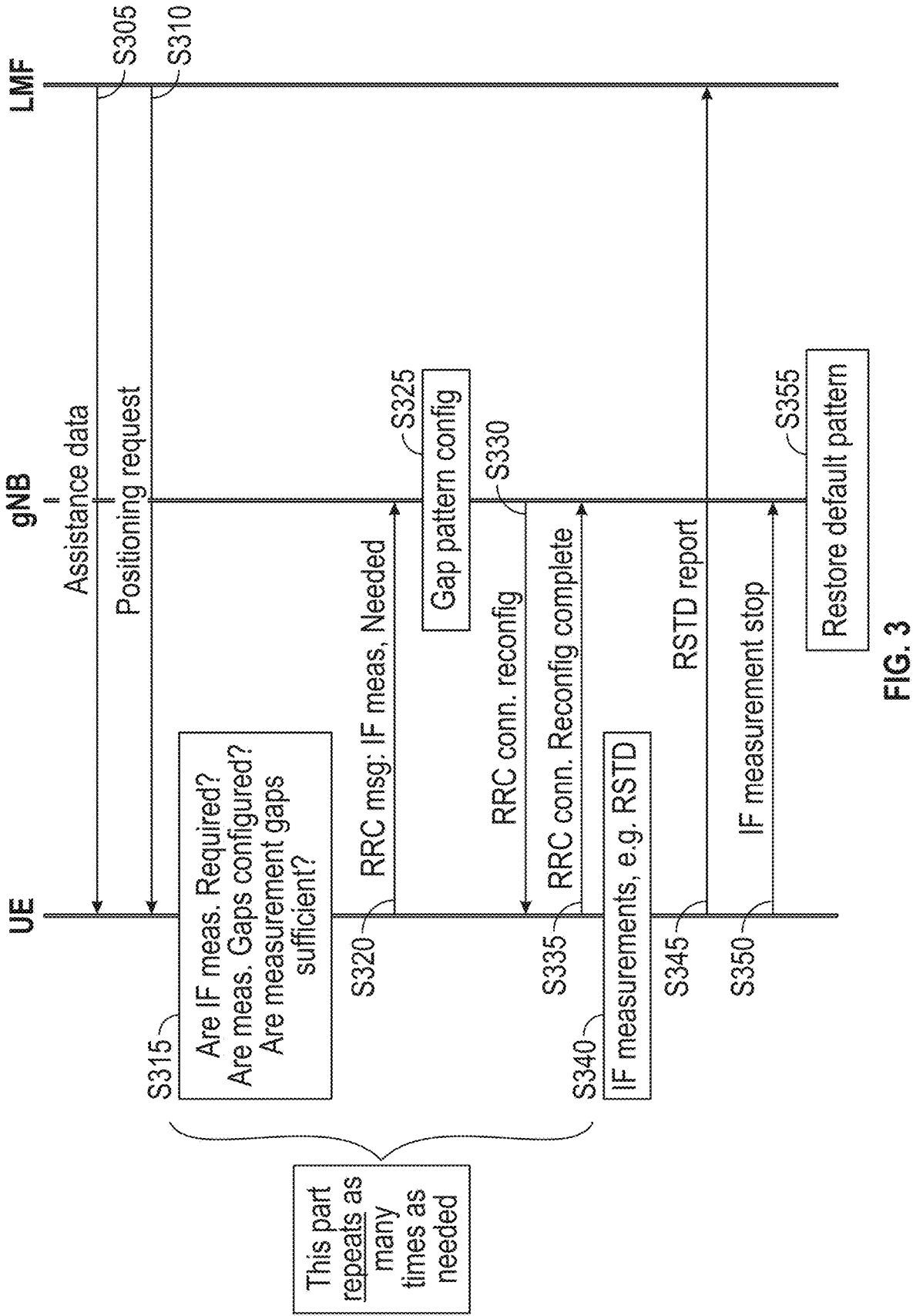
FIG. 3 is a flowchart illustrating a comparative example method of reconfiguring a measurement gap pattern.
Figure 4:
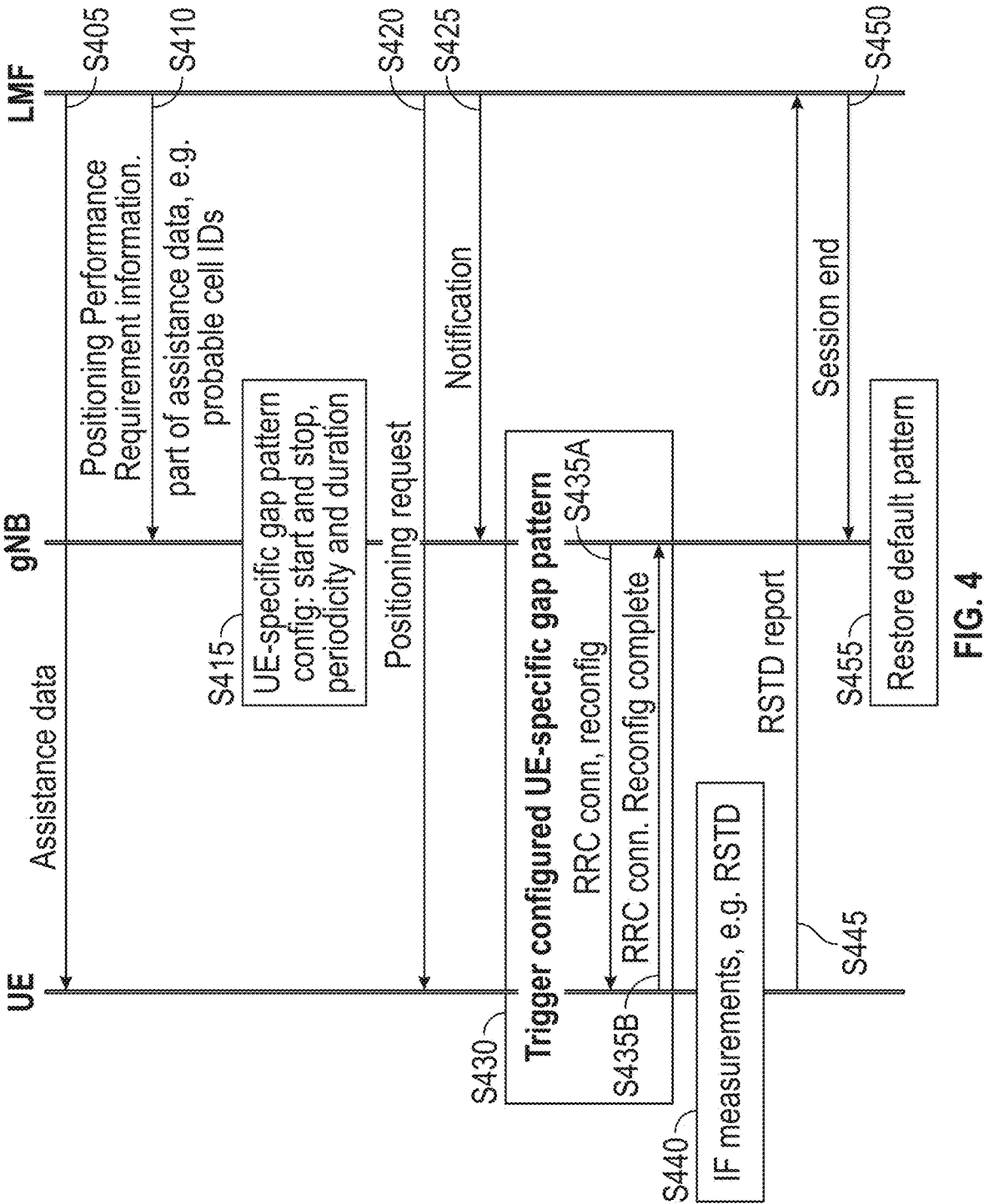
FIG. 4 is a flowchart illustrating a first example method of reconfiguring a measurement gap pattern, according to at least some example embodiments.
Figure 5:
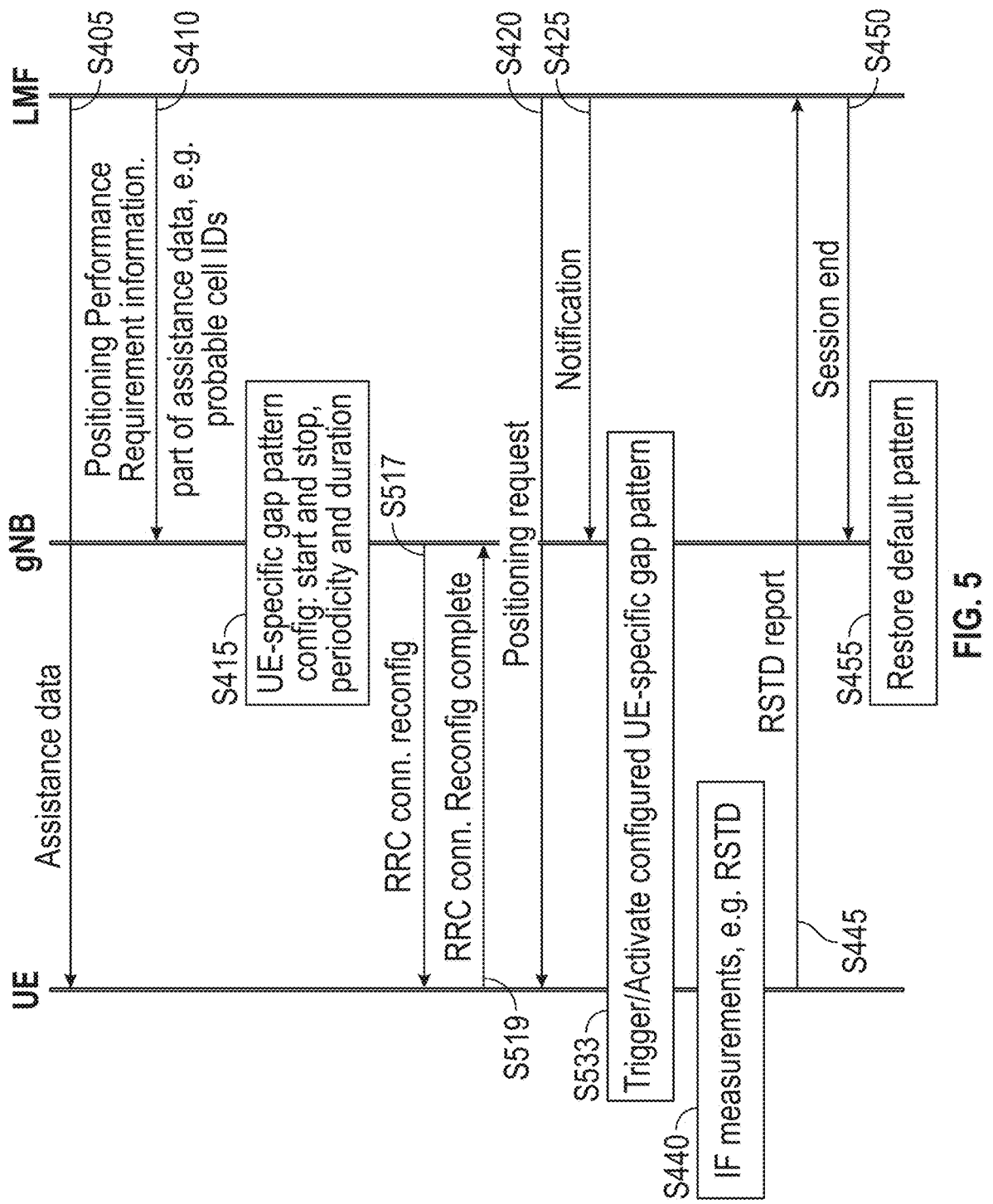
FIG. 5 is a flowchart illustrating a second example method of reconfiguring a measurement gap pattern, according to at least some example embodiments.
Figure 6:
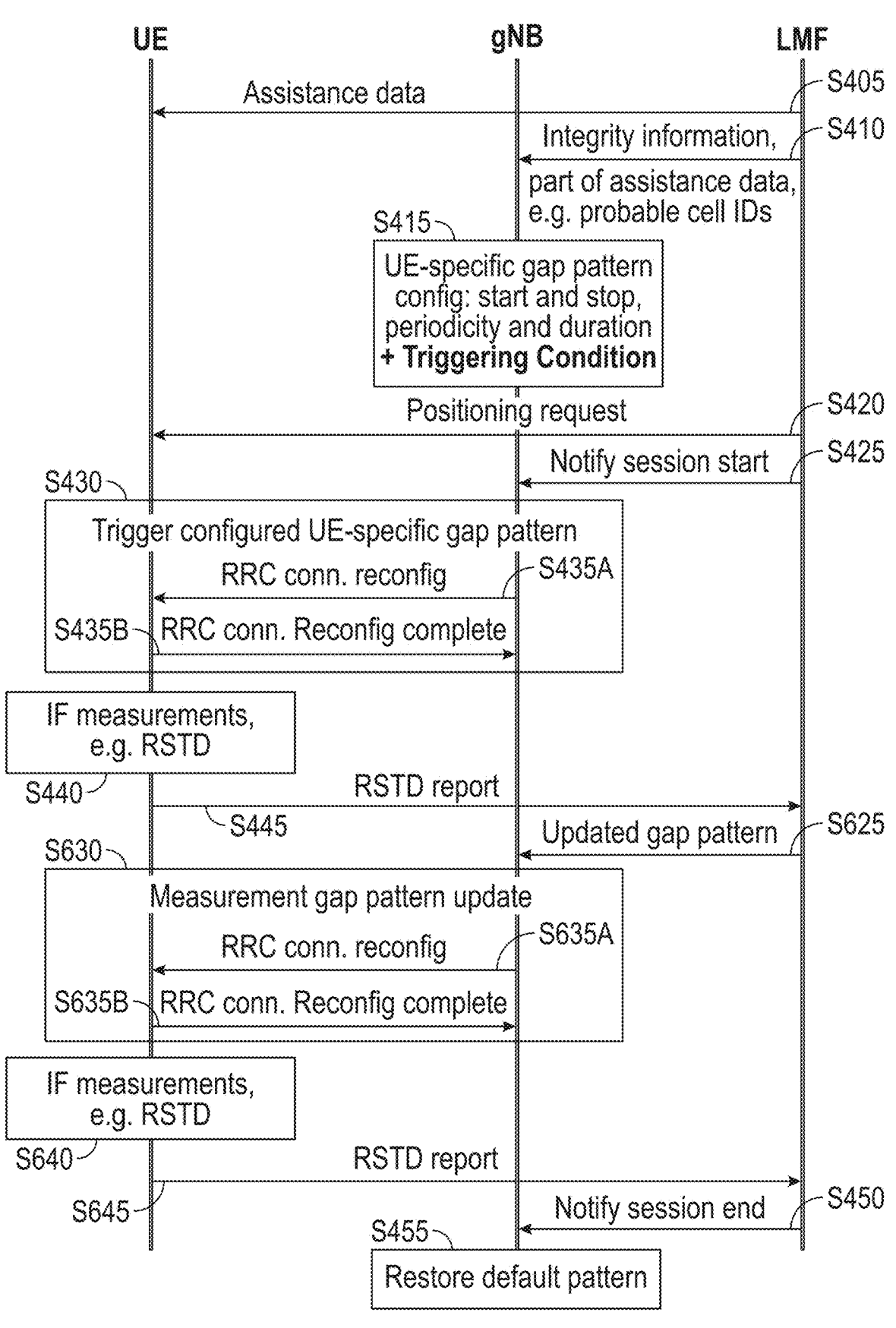
FIG. 6 is a flowchart illustrating a third example method of reconfiguring a measurement gap pattern, according to at least some example embodiments.

FIG. 3 is a flowchart illustrating a comparative example method of reconfiguring a measurement gap pattern. FIGS. 4-6 are flowcharts illustrating, respectively, first through third example methods of configuring a measurement gap pattern, according to at least some example embodiments. FIGS. 3-6 will be explained below with reference to the wireless communications network 100 of FIG. 1 and an example scenario in which the gNB 120 is the serving gNB of the UE 110. Accordingly, the gNB 120 may also be referred to, in the present specification, as the serving gNB 120 or the serving cell 120. FIG. 3 will now be discussed below.

The method illustrated in FIG. 3 is described, for example, in 3GPP TS 38.331 V16.1.0 (2020-07). Referring to FIG. 3, in step S305, the LMF node 130 sends assistance data to the UE 110. For example, the LMF node 130 may send assistance data (e.g., positioning assistance data) to the UE 110 in accordance with known methods. For example 3GPP TS 38.331 V16.1.0 (2020-07) discuss example methods of providing assistance data. Further, 3GPP TS 37.355 V16.1.0 (2020-07) discusses many examples of assistance data. For example, section 6.5.5.1 of 3GPP TS 37.355 V16.1.0 (2020-07) discusses examples of OTDOA assistance data. According to at least some example embodiments, the assistance data sent by the LMF node 130 and received by the UE 110 in step S305 may include a target transmission and reception point (TRP) information list that identifies target TRPs' reference signals that are to be measured and reported by a UE during a positioning operation. According to at least some example embodiments, the target TRP information list may include information (e.g., IDs) of one or more neighbor cells and/or neighbor TRPs that the UE can detect.

In step S310, the LMF node 130 sends the UE 110 a positioning request.

In step S315, the UE 110 determines, based on the assistance data received in step S305, whether the UE 110 needs to perform IF measurements (e.g., IF measurements with respect to neighbor cells). If the UE 110 determines that IF measurements are needed, the UE 110 also determines whether MGs have been configured (e.g., the UE 110 determines whether the gNB has configured the UE 110 with an MG pattern). If, in step S315, the UE 110 determines that the MGs have not been configured, or the UE 110 determines that the MGs have been configured, but the MGs are not sufficient to perform the IF measurements, the UE 110 proceeds to step S320.

In step S320, the UE 110 sends an RRC message to the serving gNB 120 indicating that the UE 110 needs to perform IF measurements (e.g., the UE 110 sends the gNB 120 a reconfiguration request).

In step S325, the gNB 120 responds to the RRC message received by the gNB 120 in step S320 by determining a MG pattern. For example, the determined MG pattern may specify a duration and a periodicity of MGs within the MG pattern.

In step S330, the gNB 120 reconfigures the UE 110 with the determined MG pattern, for example, by sending an RRC connection reconfiguration message indicating the determined MG pattern to the UE 110.

In step S335, the UE 110 sends the gNB 120 a message indicating that the RRC connection reconfiguration is complete, and the gNB 120 receives the message.

As is illustrated in FIG. 3, steps S315-S335 may be completed multiple times. For example, steps S315-S335 may be completed iteratively until the UE 110 determines that all the transmission and reception points (TRPs) included in the assistance data message have been measured (e.g., until all desired IF measurements have been performed). Accordingly, in the comparative example method illustrated in FIG. 3, the UE 110 and the gNB 120 may ping-pong RRC configuration request messages and acknowledgements back and forth between each other thus resulting in a large amount of overhead and an inefficient us of network resources.

In step S340, the UE 110 uses the MG pattern with which the UE 110 was configured in step S330 reconfigured to perform IF measurements with respect to one or more neighbor cells. For example, the UE 110 may perform reference signal time difference (RSTD) measurements in step S340.

In step S345, the UE 110 may report the results of the IF measurements performed in step S340 to the LMF node 130. For example, if the UE 110 performed RSTD measurements in step S340, then the UE 110 may report the RSTD measurements to the LMF node 130 in step S345.

In step S350, the UE 110 may send the gNB 120 a message indicating that the UE 110 has finished performing IF measurements.

In response to receiving the message indicating that the UE 110 has finished performing IF measurements in step S350, the gNB 120 may restore a default MG pattern in step S355.

A first example method of reconfiguring a measurement gap pattern, according to at least some example embodiments, will now be discussed with reference to FIG. 4 below.

Referring to FIG. 4, in step S405, the LMF 130 send assistance data to the UE 110. According to at least some example embodiments, step S405 may be performed in the same manner discussed above with respect to step S305 of FIG. 3.

In step S410, the LMF node 130 sends position positioning performance target information and a portion of the assistance data (i.e., a portion of the assistance data send to the UE 110 in step S405) to the serving gNB 120. According to at least some example embodiments, the positioning performance target information sent by the LMF node 130 an received by the gNB 120 in step S410 includes desired or, alternatively, required performance values. As was discussed above, examples of these performance values include, but are not limited to:

(i) position accuracy (e.g., desired or, alternatively, required location precision values such as less than 1 meter (m), less than 0.2 meters (m), etc.); and (ii) target latency measured as the elapsed time from the location request to the obtaining of the location coordinates (e.g., desired or, alternatively, required latency values such as less than 100 milliseconds (ms), less than 10 milliseconds (ms), etc.).

Further, positioning performance target information may differ, respectively, for different applications as is discussed, for example, in 3GPP document RP-193237.

According to at least some example embodiments, the portion of assistance data sent by the LMF node 130 and received by the gNB 120 in step S410 may include, for example, a target TRP information list that identifies cells that will be probable targets for measurement by the UE 110 if the UE 110 performs a positioning operation. The target TRP information list may include cell IDs of neighbor cells of the UE 110.

In step S415, the gNB 120 determines a UE-specific MG pattern for the UE 110. The UE-specific MG pattern may include a start point, a stop point, a MG periodicity and a MG duration. The gNB 120 may determine the UE-specific MG pattern based on the positioning performance target information and the portion of the assistance data received from the LMF 130 in step S410. For example, the gNB 120 may use the target TRP information list received in step S410 to retrieve carriers and PRS patterns of one or more cell included in the target TRP information list. According to at least some example embodiments, the target TRP information list indicates the relative measurement priorities of each of the listed target TRPs. Thus, according to at least some example embodiments, the gNB 120 may retrieve carriers and PRS patterns of only a threshold number of the highest priority target TRPs. Further, the gNB 120 may use the retrieved carriers and PRS patterns of the target TRPs to determine the start point, stop point, duration and/or periodicity of the UE-specific MG pattern.

According to at least some example embodiments, the gNB 120 determines the UE-specific MG pattern in step S415 preemptively. For example, in contrast to the comparative example shown in FIG. 3, in step S415 of FIG. 4, the gNB 120 determines the UE-specific MG pattern before the LMF 130 sends a positioning request to the UE 110.

In step S420, the LMF node 130 sends a positioning request to the UE 110, for example, in accordance with known methods.

In step S425, the LMF 130 sends a positioning session start notification message to the gNB 120. According to at least some example embodiments, the LMF 130 sends a positioning session start notification message to the gNB 120 (e.g., to notify the gNB 120 of the start of a positioning session with respect to the UE 110) whenever the LMF 130 sends a positioning request to the UE 110. Thus, in contrast with the comparative model shown in FIG. 3, the gNB 120 is no longer unaware of the positioning request having been sent to the UE 110 because of the positioning session start notification message.

In step S430, the determined UE-specific MG pattern is triggered. According to at least some example embodiments, step S430 includes 2 sub-steps, S435A and S435B. For example, in step S435A, the gNB 120 re-configures the UE 110 with the UE-specific MG pattern determined in step S415 (e.g., by sending an RRC connection reconfiguration message including the UE-specific MG pattern to the UE 110). Further, in step S435B, the UE 110 may send an RRC connection reconfiguration completion message to the gNB 120 indicating that the UE has completed reconfiguration and is now operating in accordance with the UE-specific MG pattern received in step S435A.

Thus, in the first example method of FIG. 4, the gNB 120 triggers the UE 110 to operate in accordance with the UE-specific MG pattern determined in step S415 by sending the RRC connection reconfiguration message including the UE-specific MG pattern to the UE 110 in step S435A.

In steps S440 and S445, the UE 110 performs IF measurements with respect to one or more neighbor cells using the determined UE-specific MG pattern and reports the results of the IF measurements to the LMF 130. According to at least some example embodiments, the UE 110 may perform step S440 and S445 in the same manner as that discussed above with reference to steps S340 and 345 of FIG. 3.

In step S450, the LMF 130 sends a positioning session end notification message to the gNB 120. For example, the LMF 130 may send the positioning session end notification message to the gNB 120 in response to the results of the IF measurements being reported to the LMF 130 in step S445. Thus, in contrast with the comparison method of FIG. 3, the gNB 120 is explicitly notified of the end of the positioning session by the LMF 130 in step S450.

In step S455, the gNB 120 may restore a default MG pattern, for example, in the same method discussed above with respect to step S355 of FIG. 3. Alternatively, the gNB 120 and UE 110 may maintain the UE-specific MG pattern determined in step S415 (e.g., without reverting back the MG pattern in use at the UE 110 and gNB 120 prior to steps S415 and S435A).

A second example method of reconfiguring a measurement gap pattern, according to at least some example embodiments, will now be discussed with reference to FIG. 5 below.

The second example MG pattern reconfiguration method of FIG. 5 is similar to the first example MG pattern reconfiguration method of FIG. 4. Accordingly, the description of the second example MG pattern reconfiguration method of FIG. 5 will focus on the differences between the second example MG pattern reconfiguration method of FIG. 5 and the first example MG pattern reconfiguration method of FIG. 4. The second example MG pattern reconfiguration method of FIG. 5 differs from the first example MG pattern reconfiguration method of FIG. 4 primarily with respect to the manner in which the UE 110 is triggered to begin using the UE-specific GM pattern determined by the gNB 120.

For example, as is illustrated in FIG. 5, the gNB 120 may send the RRC connection reconfiguration message, which includes the UE-specific MG pattern determined in step S415, to the UE 110 in step S517 before the LMF 130 sends the positioning request to the UE 110 in step S420 and before the LMF 130 sends the positioning session start notification message to the gNB 120 in step S425. In step S519, the UE 110 may send an RRC connection reconfiguration completion message to the gNB 120 indicating that the UE has completed reconfiguration and is prepared to operate in accordance with the UE-specific MG pattern determined in step S415. Additionally, the gNB 120 may send triggering conditions to the UE 110 (e.g., in the RRC connection reconfiguration message sent in step S517 or a different message). The triggering condition may control the circumstances under which the UE 110 begins operating in accordance with the UE-specific MG pattern determined in step S415. Specifically, though the UE 110 is capable of operating in accordance with the determined UE-specific MG pattern after receiving the determined UE-specific MG pattern in step S517, the determined UE-specific MG pattern waits until after the triggering conditions sent by the gNB 120 are satisfied before operating in accordance with the determined UE-specific MG pattern.

In the example illustrated in FIG. 5, the triggering condition is the receipt of a positioning request from the LMF 130. Thus, as is illustrated in FIG. 5, the UE 110 is triggered to begin operating in accordance with the determined UE-specific MG pattern in step S533 after the LMF 130 sends the positioning request in step S425. Additionally, according to at least some example embodiments, the gNB 120 is also triggered to be operating in accordance with the determined UE-specific MG pattern in step S533, for example, in response to receiving the positioning session start notification in step S425.

A third example method of reconfiguring a measurement gap pattern, according to at least some example embodiments, will now be discussed with reference to FIG. 6 below.

The third example MG pattern reconfiguration method of FIG. 6 is similar to the first example MG pattern reconfiguration method of FIG. 4. Accordingly, the description of the third example MG pattern reconfiguration method of FIG. 6 will focus on the differences between the third example MG pattern reconfiguration method of FIG. 6 and the first example MG pattern reconfiguration method of FIG. 4.

The third example MG pattern reconfiguration method of FIG. 6 relates to the case of a continuous positioning request, i.e., the case where the position of the UE is periodically updated based on measurement reports provided at a given rate. In such a case, the MG pattern may be updated periodically because the MG pattern may change due to, for example, mobility of the UE 110. For example, as the UE 110 moves relative to the serving cell and its neighbor cells, the desired or, alternatively, optimal parameters of the MG pattern (e.g., start point, stop point, MG duration and/or MG periodicity) may also change.

According to at least some example embodiments, the updated MG pattern is provided to the serving gNB 120 by the LMF 130 in step S625. Next, the updated MG pattern is triggered in step S630. For example, in step S635A, the gNB 120 provides the updated MG pattern to the UE 110 (e.g., in an RRC connection configuration message), and in step S635B, the UE 110 may send an RRC connection reconfiguration completion message to the gNB 120 indicating that the UE 110 has completed reconfiguration and is now operating in accordance with the updated MG pattern received in step S635A.

In steps S640 and S645, the UE 110 performs IF measurements with respect to one or more neighbor cells using the updated MG pattern and reports the results of the IF measurements to the LMF 130.

According to at least some example embodiments, steps S625 through S645 may be repeated periodically.

According to at least some example embodiments, the periodically updated MG patterns can be thought of as a means of keeping track of the measurements which are needed as the continuous session remains active while the quality of the measured RSTDs change.

Thus, MG pattern reconfiguration methods according to at least some example embodiments include one of more of the following features:

1) LMF-gNB pre-positioning signaling: For example, the LMF informs the serving gNB about the positioning performance target information of the UE and about the impeding positioning session, by transferring some of the UE assistance data.

2) gNB pre-emptive UE-specific MG configuration: For example, the serving gNB may use information sent from the LMF to determine a desirable or, alternatively, optimum MG pattern for the respective UE.

3) LMF notifies gNB of session start: For example, the LMF may send a notification message to the gNB that a position session has been requested for the UE. This acts as a trigger for the MG reconfiguration with determined MG pattern.

4) gNB and UE handshake on the UE-specific MG: For example, the determined MG pattern may be signaled to the UE and acknowledged by the latter in a RRC message exchange. The determined MG pattern could be triggered at the UE immediately after configuration (e.g., FIG. 4), or conditionally activated if and only if the UE receives a measurement request from the LMF (e.g., FIG. 5).

5) LMF notifies gNB about the session end: For example, once the IF measurements have been performed using the acknowledged MG pattern, the LMF may end the positioning session and notify the gNB to restore the default MG pattern.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided above to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing UE, base stations, eNBs, RRHs, gNBs, femto base stations, network controllers, computers, Central Units (CUs), ng-eNBs, other radio access or backhaul network elements, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, UEs, base stations, eNBs, RRHs, gNBs, femto base stations, network controllers, computers, Central Units (CUs), ng-eNBs, other radio access or backhaul network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A wireless communications system comprising:
a first network element, the first network element being a first location management function (LMF) node in a core network of the wireless communications system;
a serving next generation Node B (serving gNB) in a radio access network of the wireless communications system, the serving gNB serving a user equipment (UE) of the wireless communication system; and
a second network element, the second network element being a second LMF node in the serving gNB in the radio access network of the wireless communications system,
the first network element comprising:
first memory storing first computer-executable instructions; and
a first processor configured to execute the first computer-executable instructions, wherein the first computer-executable instructions, when executed by the first processor, cause the first network element at least to perform:
sending, by the first network element, assistance data to the UE of the wireless communications system, the assistance data comprising:
target transmission and reception point (TRP) information list, which includes one of more cell IDs of one or more target TRPs of the UE, and observed time difference of arrival (OTDOA) assistance data;

sending, by the first network element, positioning performance target data and all of the assistance data to the serving gNB of the UE, the positioning performance target data comprising:

a desired position accuracy, a required position accuracy, a desired target latency measured as elapsed time from location request to obtaining location coordinates, and a required target latency measured as elapsed time from location request to obtaining location coordinates;

sending a first positioning request to the UE;

notifying the serving gNB that a first positioning session has started with respect to the UE by sending a first positioning session start notification message to the serving gNB;

receiving inter-frequency measurement results from the UE; and notifying the serving gNB that the first positioning session has ended with respect to the UE by sending a first positioning session end notification message to the serving gNB; and the second network element comprising:

second memory storing second computer-executable instructions; and a second processor configured to execute the second computer-executable instructions, wherein the second computer-executable instructions, when executed by the second processor, cause the second network element at least to perform:

sending, by the second network element, the assistance data to the UE of the wireless communications system;

sending, by the second network element, the positioning performance target data and all of the assistance data to the serving gNB of the UE;

sending a second positioning request to the UE;

notifying the serving gNB that a second positioning session has started with respect to the UE by sending a second positioning session start notification message to the serving gNB;

receiving inter-frequency measurement results from the UE; and notifying the serving gNB that the second positioning session has ended with respect to the UE by sending a second positioning session end notification message to the serving gNB; and the serving gNB comprising:

third memory storing third computer-executable instructions; and a third processor configured to execute the third computer-executable instructions, wherein the third computer-executable instructions, when executed by the third processor, cause the serving gNB at least to perform:

determining a measurement gap (MG) pattern based on the positioning performance target data and the assistance data, the determined MG pattern including an MG duration and an MG periodicity;

reconfigure the UE with the determined MG pattern, the reconfiguring comprising:

with regard to the first LMF node in the core network, reconfiguring the UE with the determined MG pattern only after a positioning request is sent by the first LMF node in the core network, and with regard to the second LMF node in the serving gNB, reconfiguring the UE with the determined MG pattern after the gNB preemptively determines the MG pattern before the second LMF node in the serving gNB sends a positioning request, and only triggering use of the determined MG pattern at the UE after a positioning request is received at the UE from the second LMF node in the serving gNB.

* * * * *